US011195267B1

(12) United States Patent
Ilan et al.

(10) Patent No.: US 11,195,267 B1
(45) Date of Patent: Dec. 7, 2021

(54) MULTI-PERSPECTIVE WAFER ANALYSIS USING AN ACOUSTO-OPTIC DEFLECTOR

(71) Applicant: Applied Materials Israel Ltd., Rehovot (IL)

(72) Inventors: Harel Ilan, Rehovot (IL); Doron Korngut, Modiin (IL); Ori Golani, Ramat Gan (IL); Ido Almog, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

(21) Appl. No.: 16/926,395

(22) Filed: Jul. 10, 2020

(51) Int. Cl.
*G06T 7/00* (2017.01)
*G01N 21/95* (2006.01)

(52) U.S. Cl.
CPC ....... *G06T 7/0004* (2013.01); *G01N 21/9501* (2013.01); *G06T 2207/30148* (2013.01)

(58) Field of Classification Search
CPC ........ G06T 7/0004; G06T 2207/30148; G01N 21/9501
See application file for complete search history.

(56) References Cited

U.S. PATENT DOCUMENTS 9,810,643 B1 * 11/2017 Shoham ........... G01N 21/95623

* cited by examiner

*Primary Examiner* — Jamil Ahmed
(74) *Attorney, Agent, or Firm* — Kilpatrick Townsend & Stockton LLP

(57) ABSTRACT

Disclosed herein is a computerized system including scanning equipment configured to obtain multi-perspective scan data of a slice on a sample. The scanning equipment includes: (i) a light source configured to generate a light beam; (ii) an acousto-optic deflector (AOD) configured to focus the light beam such as to generate a beam train scanned along consecutive lines on the slice, in groups of $n \geq 2$ successively scanned lines, along each of which the beam train forms at least one illumination spot, respectively; and (iii) one or more detectors configured to sense light returned from the slice. The $n \geq 2$ lines are scanned different perspectives, respectively. The consecutive lines may be longitudinally displaced relative to one another, such as to overlap in $100 \cdot (n-1)/n$ % of widths thereof, so that the slice may be fully scanned in each of the perspectives.

20 Claims, 6 Drawing Sheets

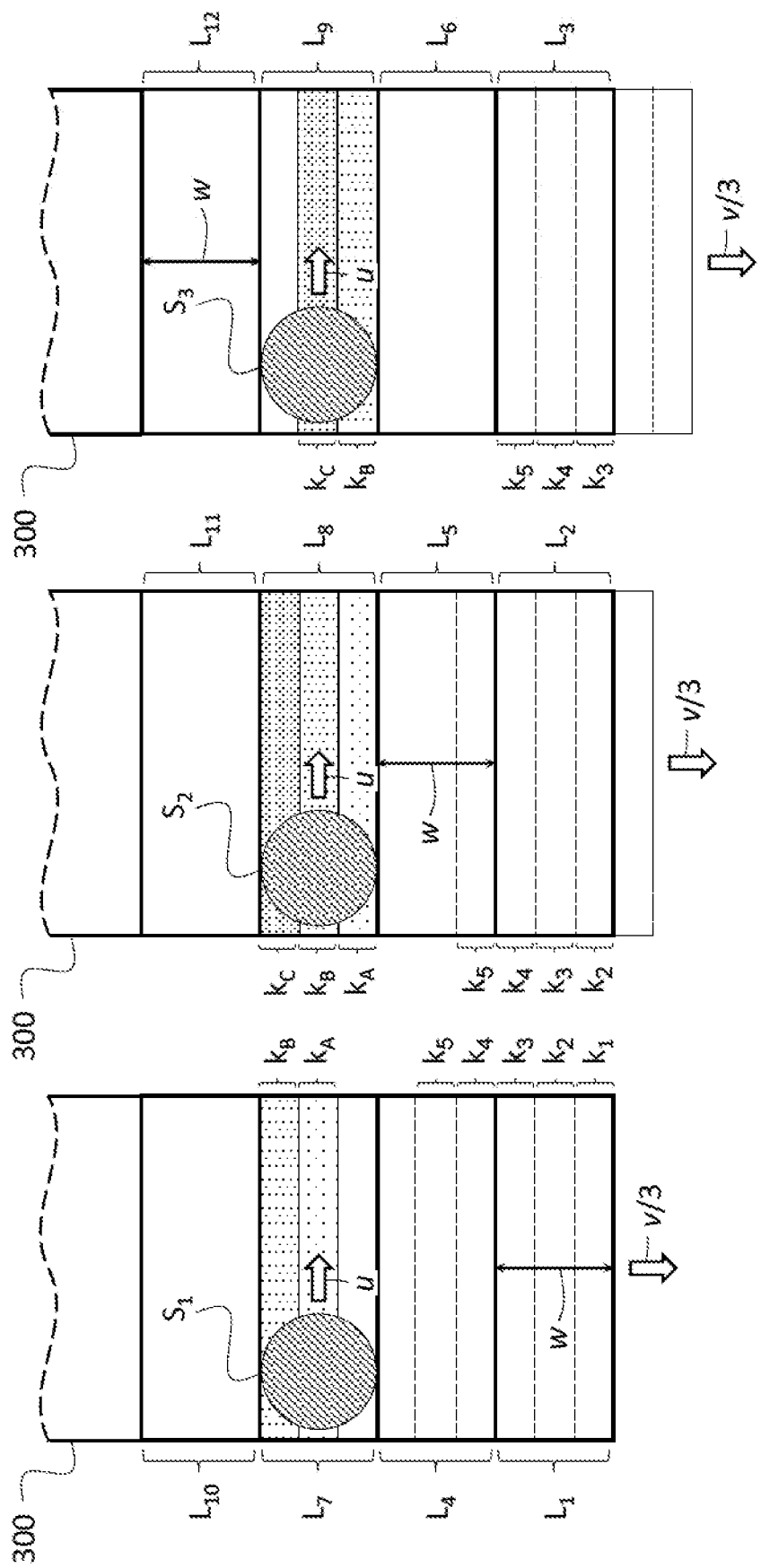

Line 1 is scanned in the first perspective. — 410

Line 2 is scanned in the second perspective. Line 2 is longitudinally displaced with respect to line 1 by $w/3$, wherein $w$ is the width of the lines. — 420

Line 3 is scanned is the third perspective. Line 3 is longitudinally displaced with respect to line 1 by $2 \cdot w/3$. — 430

Line 4 is scanned in the first perspective. Line 4 is longitudinally displaced with respect to line 1 by $w$. — 440

Line 5 is scanned in the second perspective. Line 5 is longitudinally displaced with respect to line 4 by $w/3$. — 450

Line 6 is scanned is the third perspective. Line 6 is longitudinally displaced with respect to line 4 by $2 \cdot w/3$. — 460

Employing an acousto-optic deflector to sequentially scan a first group of $n$ lines on a first slice on a sample. Each line is scanned in a respective perspective. Starting with the second line, each line is displaced with respect to the last scanned line by $d/n$, or substantially $d/n$, wherein $d$ is the width of the lines.
— 710

Repeating operation 710 $N - 1$ more times with respect to $N - 1$ groups of $n$ lines in the slice, such that each line in the $m$-th group is displaced by $(m - 1) \cdot d$ with respect to a corresponding line in the first group.
— 720

Repeating operations 710 and 720 with respect to one or more additional slices.
— 730

700

Fig. 7

MULTI-PERSPECTIVE WAFER ANALYSIS USING AN ACOUSTO-OPTIC DEFLECTOR

TECHNICAL FIELD

The present disclosure relates generally to wafer analysis.

BACKGROUND

As design rules shrink, wafer analysis tools are accordingly required to detect increasingly smaller defects. Previously, defect detection was mainly limited by laser power and detector noise. Currently, state-of-the-art wafer analysis tools are mostly limited by wafer noise due to diffuse reflection from the surface of the wafer: Surface irregularities on the wafer, constituted by the roughness of the etched patterns, are often manifested as bright spots (speckles) in a scanned image. These bright spots may highly resemble the "thumbprint" (signature) of a defect. There is thus a need for improved techniques of distinguishing defects from wafer noise.

SUMMARY

Aspects of the disclosure, according to some embodiments thereof, relate to multi-perspective wafer analysis. More specifically, but not exclusively, aspects of the disclosure, according to some embodiments thereof, relate to multi-perspective wafer analysis using an acousto-optic deflector.

Thus, according to an aspect of some embodiments, there is provided a computerized system for obtaining multi-perspective scan data of a sample (e.g. a wafer, a photomask, or a reticle). The system includes scanning equipment, which includes:
  A light source configured to generate at least one light beam.
  An acousto-optic deflector (AOD) configured to focus the at least one light beam such as to generate a beam train scanned along consecutive lines on the slice, in groups of n≥2 successively scanned lines. Along each of which lines the beam train forms at least one illumination spot, respectively.
  One or more detectors configured to sense light returned from the slice.

The n≥2 lines are scanned in different (preparation) perspectives, respectively, from a multiplicity of perspectives. Consecutive lines are longitudinally displaced relative to one another, such as to overlap in, or substantially in, 100·(n−1)/n % of widths thereof, so that the slice is fully, or substantially fully, scanned in each of the perspectives.

According to some embodiments of the computerized system, the multiplicity of perspectives includes at least n perspectives. Each perspective defined by a compatible combination of a preparation perspective, selected from a group of at least n preparation perspectives, and a collection perspective selected from a group of one or more collection perspectives. The at least n preparation perspectives are selected from an intensity of an illumination beam, a polarization of the illumination beam, an illumination wavefront, an illumination spectrum, a focus offset of the illumination beam, one or more maskings of the illumination beam, relative phase(s) between distinct sub-beams of the illumination beam, and compatible combinations thereof. The at least one collection perspective is selected from an intensity of returned light, a polarization of returned light, a spectrum of returned light, a collection angle(s), a brightfield channel, a grayfield channel, one or maskings of the returned light, Fourier filtering of returned light, and a sensing type selected from intensity, phase, or polarization, and compatible combinations thereof.

According to some embodiments of the computerized system, a longitudinal component of a relative velocity between the beam train and the sample is proportional to, or substantially proportional to, 1/n.

According to some embodiments of the computerized system, the AOD includes an acousto-optic medium and an electroacoustic transducer mechanically coupled to the acousto-optic medium. The light source is configured to irradiate the acousto-optic medium with the at least one light beam. The scanning equipment further includes a waveform generator electrically coupled to the electroacoustic transducer such as to allow generating a series of acoustic pulses traveling along the acousto-optic medium. Each of the acoustic pulses may be configured to focus a portion of the at least one light beam such as to produce an illumination spot, or an array of illumination spots, on a respective line from the n lines.

According to some embodiments of the computerized system, the system further includes a scan data analysis module configured to perform an integrated analysis of multi-perspective scan data obtained in the scan.

According to some embodiments of the computerized system, the scan data analysis module is configured to sort image data of scanned lines according to respective perspectives thereof, such as to generate image frames in each of the multiplicity of perspectives.

According to some embodiments of the computerized system, the integrated analysis includes:
  Computing, based on the obtained scan data, and/or estimating cross-perspective covariances.
  Determining presence of defects in the slice, taking into account the cross-perspective covariances.

According to some embodiments of the computerized system, the integrated analysis further includes, for each of a plurality of sub-areas of the slice:
  Generating difference values in each of the multiplicity of perspectives based on the obtained scan data of the sub-area and corresponding reference data of the sub-area in each of the multiplicity of perspectives.
  Determining whether the sub-area is defective, based at least on the difference values corresponding to the sub-area and to sub-areas neighboring the sub-area, and noise values corresponding to the sub-area and to the neighboring sub-areas. The noise values include corresponding covariances from the cross-perspective covariances.

According to some embodiments of the computerized system, the scan data analysis module is further configured to generate difference images of each of the plurality of sub-areas in each of the multiplicity of perspectives based on the obtained scan data and the reference data. The difference values corresponding to each sub-area, from the plurality of sub-areas, are derived from, and/or characterize, sub-images of the difference images, which correspond to the sub-area.

According to some embodiments of the computerized system, the determining of whether each of the plurality of sub-areas is defective includes:
  Generating a covariance matrix including the noise values corresponding to the sub-area and the sub-areas neighboring the sub-area.
  Multiplying a first vector, including the difference values corresponding to the sub-area and the neighboring sub-areas, by the inverse of the covariance matrix (i.e.

multiplying the first vector by the matrix $M=C^{-1}$, wherein C is the covariance matrix), to obtain a second vector.

Computing a scalar product of the second vector and a third vector, whose components include values characterizing a defect.

Labeling the sub-area as defective if the scalar product is greater than a predetermined threshold.

According to some embodiments of the computerized system, the system further includes a fast polarization control unit, which is configured to allow alternately scanning consecutive lines, or groups of consecutive lines, in different polarizations, respectively. The fast polarization control unit is positioned between the AOD and an objective lens of the system. The polarization control unit may include an electro-optic crystal.

According to some embodiments of the computerized system, the fast polarization control unit is configured to controllably modulate and/or rotate a polarization of the at least one light beam or a portion thereof.

According to some embodiments of the computerized system, along at least one of the n lines, an array of illumination spots is produced. The illumination spots in the array are positioned sufficiently closely to one another such as to generate a pattern of interference fringes at the one or more detectors of the scanning equipment.

According to some embodiments of the computerized system, at least two illumination spots in the array differ from one another in one or more optical parameters.

According to some embodiments of the computerized system, the waveform generator and the AOD are configured to allow production of stereo images by alternatingly illuminating a first half and a second half of an illumination pupil of the scanning equipment, or, more generally, by alternatingly illuminating any two parts of the illumination pupil.

According to some embodiments of the computerized system, the sample is a patterned wafer.

According to some embodiments of the computerized system, the electroacoustic transducer is a piezoelectric transducer.

According to an aspect of some embodiments, there is provided a method for obtaining multi-perspective scan data of a sample (e.g. a wafer, a photomask, or a reticle). The method includes obtaining scan data, in a multiplicity of perspectives, of a slice of a sample by utilizing an acousto-optic deflector (AOD) generate a beam train. The beam train may be scanned along consecutive lines on the slice, in groups of n≥2 successively scanned lines, such that (i) along each line the beam train forms an illumination spot, or an array of illumination spots, respectively, and (ii) each line in each group of n≥2 lines is scanned in a respective (preparation) perspective from the multiplicity of perspectives. Consecutive lines are longitudinally displaced relative to one another, such as to overlap in, or substantially in, 100·(n−1)/n % of widths thereof, so that the slice is fully, or substantially fully, scanned in each of the perspectives.

According to some embodiments of the method, the multiplicity of perspectives includes at least n perspectives. Each perspective is defined by a compatible combination of a preparation perspective, selected from a group of at least n preparation perspectives, and a collection perspective selected from a group of one or more collection perspectives. The at least n preparation perspectives are selected from an intensity of an illumination beam, a polarization of the illumination beam, an illumination wavefront, an illumination spectrum, a focus offset of the illumination beam, one or more maskings of the illumination beam, relative phase(s) between distinct sub-beams of the illumination beam, and compatible combinations thereof. The at least one collection perspective is selected from an intensity of returned light, a polarization of returned light, a spectrum of returned light, a collection angle(s), brightfield channel, grayfield channel, one or maskings of the returned light, Fourier filtering of returned light, and a sensing type selected from intensity, phase, or polarization, and compatible combinations thereof.

According to some embodiments of the method, a longitudinal component of a relative velocity between the beam train and the sample is proportional to, or substantially proportional to, 1/n.

According to some embodiments of the method, the AOD includes an acousto-optic medium and an electroacoustic transducer mechanically coupled to the acousto-optic medium. In the obtaining of the scan data: (i) The acousto-optic medium is irradiated with the at least one light beam. (ii) A series of voltage pulses is applied across the electroacoustic transducer, thereby generating a series of acoustic pulses, which travel along the acousto-optic medium. Each of the acoustic pulses is configured to focus a portion of the at least one light beam such as to produce an illumination spot, or an array of illumination spots, on a respective line from then lines.

According to some embodiments of the method, a generation of at least one of the at least n preparation perspectives includes passing the at least one light beam, or a portion thereof, through a fast polarization control unit. The fast polarization control unit is configured to allow alternately scanning consecutive lines, or groups of consecutive lines, in different polarizations, respectively.

According to some embodiments of the method, the fast polarization control unit an electro-optic crystal.

According to some embodiments of the method, the fast polarization control unit is configured to controllably modulate and/or rotate a polarization of the at least one light beam or a portion thereof.

According to some embodiments of the method, along at least one of the n lines, an array of illumination spots is produced. The illumination spots in the array may be positioned sufficiently closely to one another such as to generate a pattern of interference fringes at one or more detectors whereto scattered light from the sample is relayed.

According to some embodiments of the method, the sample is a patterned wafer.

According to some embodiments of the method, the electroacoustic transducer is a piezoelectric transducer.

According to an aspect of some embodiments, there is provided a method for obtaining and analyzing multi-perspective scan data of a sample. The method includes:

Obtaining scan data, in a multiplicity of perspectives, of a slice of a sample by implementing the above-described method for obtaining multi-perspective scan data of a sample.

Analyzing the obtained scan data by subjecting the scan data to an integrated analysis, which takes into cross-perspective covariances between different perspectives from the multiplicity of perspectives.

Optionally, at least two illumination spots in the array differ from one another in one or more optical parameters.

According to some embodiments of the method, the integrated analysis includes:

Computing, based on the obtained scan data, and/or estimating cross-perspective covariances.

Determining presence of defects in the slice, taking into account the cross-perspective covariances.

According to some embodiments of the method, the integrated analysis further includes, for each of a plurality of sub-areas of the slice:

Generating difference values in each of the multiplicity of perspectives based on the obtained scan data of the sub-area and corresponding reference data of the sub-area in each of the multiplicity of perspectives.

Determining whether the sub-area is defective, based at least on the difference values corresponding to the sub-area and to sub-areas neighboring the sub-area, and noise values corresponding to the sub-area and to the neighboring sub-areas. The noise values include corresponding covariances from the cross-perspective covariances.

According to some embodiments of the method, the integrated analysis comprises generating difference images of each of the plurality of sub-areas in each of the multiplicity of perspectives based on the obtained scan data and the reference data. The difference values corresponding to each sub-area, from the plurality of sub-areas, are derived from, and/or characterize, sub-images of the difference images, which correspond to the sub-area.

According to some embodiments of the method, the determining of whether each of the plurality of sub-areas is defective includes:

Generating a covariance matrix including the noise values corresponding to the sub-area and the sub-areas neighboring the sub-area.

Multiplying a first vector, including the difference values corresponding to the sub-area and the neighboring sub-areas, by the inverse of the covariance matrix, to obtain a second vector.

Computing a scalar product of the second vector and a third vector, whose components include values characterizing a defect.

Labeling the sub-area as defective if the scalar product is greater than a predetermined threshold.

According to an aspect of some embodiments, there is provided a computer-readable non-transitory storage medium storing instructions that cause a computerized system, as described above, to implement the above-described method for obtaining multi-perspective scan data of a sample.

According to an aspect of some embodiments, there is provided a computer-readable non-transitory storage medium storing instructions that cause a computerized system, as described above, to implement the above-described method for obtaining and analyzing multi-perspective scan data of a sample.

According to an aspect of some embodiments, there is provided a computer-readable non-transitory storage medium storing instructions that cause a sample analysis system, which includes the AOD, to obtain scan data, in a multiplicity of perspectives, of a slice of a sample by utilizing the AOD to generate a beam train. The beam train is scanned along consecutive lines on the slice, in groups of $n \geq 2$ successively scanned lines, such that (i) along each line the beam train forms at least one illumination spot, respectively, and (ii) each line in each group of $n \geq 2$ lines is scanned in a respective (preparation) perspective from the multiplicity of perspectives. Consecutive lines are longitudinally displaced relative to one another, such as to overlap in, or substantially in, $100 \cdot (n-1)/n$ % of widths thereof, so that the slice is fully, or substantially fully, scanned in each of the perspectives.

According to some embodiments of the storage medium, the instructions further cause the sample analysis system to analyze the obtained scan data by subjecting the scan data to an integrated analysis, which takes into account cross-perspective covariances between different perspectives from the multiplicity of perspectives.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIG. 3A-3C schematically depicts a three-perspective scan of a slice on a wafer employing the scanning equipment of FIG. 1, according to some embodiments;

FIG. 4 is a flowchart illustrating the order in which the lines are scanned in the three-perspective scan of FIGS. 3A-3C, according to some embodiments;

FIG. 7 is flowchart of a method for obtaining multi-perspective scan data utilizing AOD, according to some embodiments.

DETAILED DESCRIPTION

Figure 1:
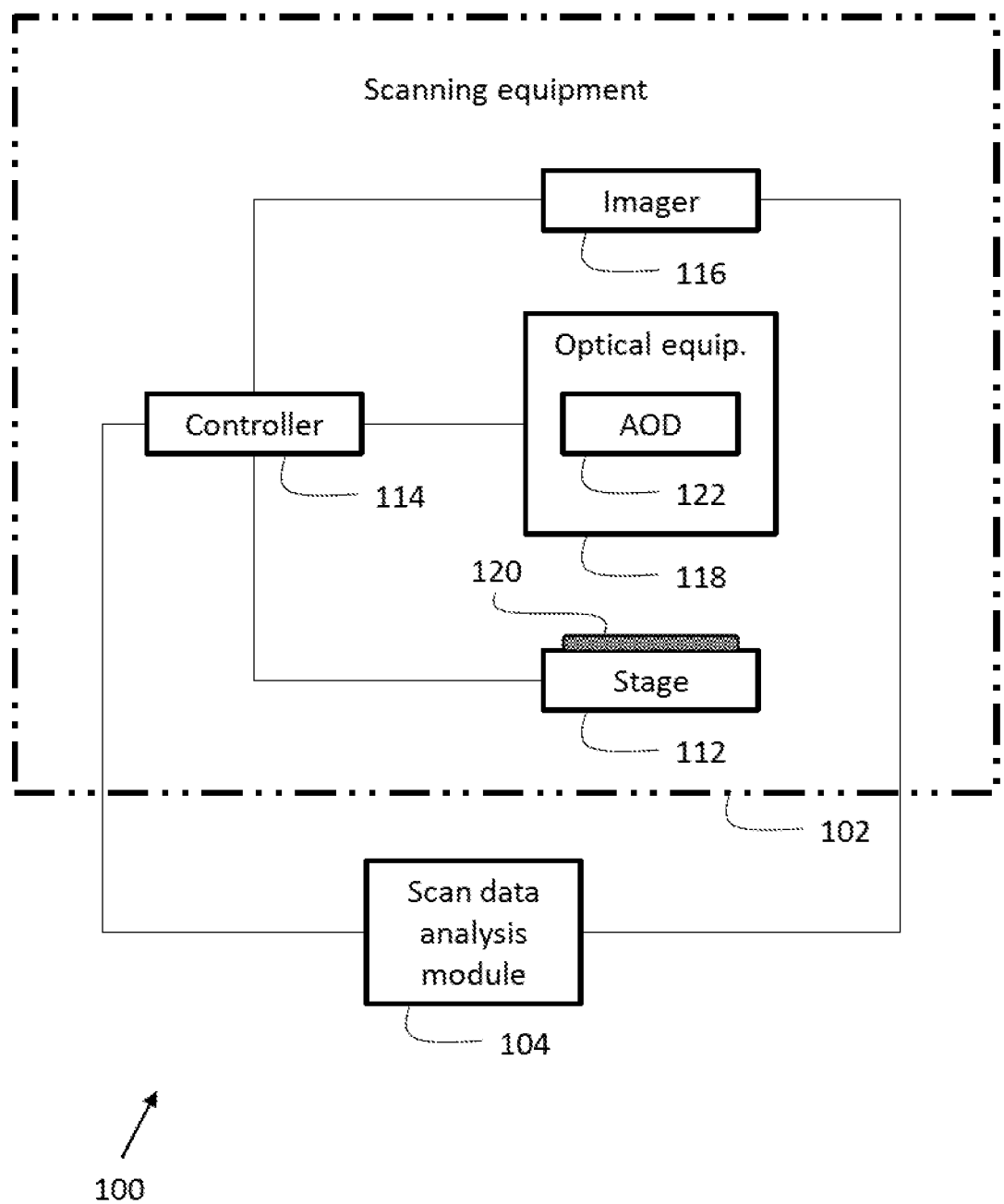
FIG. 1 presents a block diagram of a computerized system for obtaining and analyzing multi-perspective scan data of a sample (also depicted), the computerized system includes scanning equipment and a scan data analysis module, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "substantially" may be used to specify that a first property, quantity, or parameter is close or equal to a second or a target property, quantity, or parameter. For example, a first object and a second object may said to be of "substantially the same shape and dimensions" when a maximum overlap between the first object and the second object is such that at least 80% (or some other pre-defined threshold percentage) of the volume of the first object overlaps with the second object, and at least at least 80% (or some other pre-defined threshold percentage) of the volume occupied of the second object overlaps with the first object. In particular, the case. wherein the first object is of the same shape and dimensions, is also encompassed by the statement that the first object and the second object are of "substantially the same shape and dimensions".

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

Referring to the figures, in flowcharts and block diagrams, optional operations and elements/components may appear within boxes delineated by a dashed line.

Relative terms such as "top" and "bottom", when used to refer to elements in figures, are to be understood relative to the page, as held by a reader perusing the figures. Similarly, relative terms such as "above" and "below", when used to refer to elements in figures—for example, when a first element is said to be positioned "above" a second element—are to be understood as in everyday usage, so that the first element will be located closer to the top of the page than the second element.

As used herein, according to some embodiments, the terms "identifying" and "detecting" and derivatives thereof, employed in reference to defects on e.g. a wafer, may be used interchangeably.

As used herein, according to some embodiments, the term "sample" may refer to a wafer, a photomask, or a reticle. The wafer may be patterned or bare.

INTRODUCTION

An acousto-optic traveling lens system typically includes a monochromatic light source, such as a laser source, and an acousto-optic deflector (AOD). The AOD (also referred to as a Bragg cell) may include a cuboid-shaped acousto-optic medium, such as glass or crystal, and a transducer, such as a piezoelectric transducer. The transducer is coupled to the medium such as to allow inducing vibrations (i.e. soundwaves) in the medium, which travel along the length thereof. As a soundwave passes through a segment of the medium, the density of the medium changes, leading to a corresponding change in the refractive index (index of refraction). The change in the refractive index may be used to control the deflection angle of monochromatic light passing through the segment. In particular, by inducing a suitably frequency-modulated vibration (e.g. a "chirp") in the medium, a monochromatic light beam incident on the medium may be focused, such as to produce a traveling (moving) light spot. Moreover, by inducing a series of suitably frequency-modulated vibrations in the cell, an array of arbitrarily close traveling light spots may be generated.

In multi-perspective wafer analysis, scan data from a multiplicity of perspectives may be used to obtain improved defect detection rates. Different perspectives may differ from one another, for example, by phase information, polarization, collection pupil segment, focus offset, and so on. More specifically, the multi-perspective scan data may be subjected to an integrated analysis, which takes into account cross-perspective covariances (i.e. covariances between different perspectives). The extra information provided by the multiplicity of perspectives (as compared to a single perspective), particularly when subjected to an integrated analysis, may be used to cope more efficiently with wafer noise. Scan data from several perspectives may give rise to a predictable or learnable pattern, which is distinguishable from wafer noise, thus, leading to improved defect detection rates.

Generally, perspectives can be classified into two groups: illumination channel perspectives (also referred to herein as "preparation perspectives") and collection channel perspectives (also referred to herein as "collection perspectives"). Broadly, an illumination channel may determine one or more physical properties of the light beam incident on the wafer, such as the intensity, polarization, wavefront, focus offset, and/or incidence angle of the beam, as well as the relative phase between closely scanned illumination spots. In contrast, the collection channel includes sensing type (intensity, polarization, phase), as well as "filters", which are used herein in a broad sense to refer to mechanisms (e.g. segmented pupils, Fourier filters, polarizing beam splitters) configured to allow selectively collecting (and sensing) components of the radiation, returned from the wafer, which are characterized by certain physical properties, such as return (reflection, scattering) angle, intensity, and polarization. Collection channels may be further classified to brightfield and grayfield scattered light, as elaborated on below.

The present disclosure, according to an aspect of some embodiments, is directed at utilizing an acousto-optic traveling lens system in the context of multi-perspective wafer analysis. Advantageously, the use of an acousto-optic traveling lens system allows for substantially simultaneous scanning of different perspectives. Consequently, inter-perspective registration may not be required. In other words, image frames in different perspectives of a same wafer area do not have to be registered with respect to one another, thereby allowing for increased defect detection rates.

Systems

According to an aspect of some embodiments, there is provided a computerized system for obtaining and, optionally, analyzing multi-perspective scan data of a sample. FIG. 1 is a block diagram of such a computerized system, a computerized system 100, according to some embodiments. System 100 includes scanning equipment 102 and a scan data analysis module 104.

Scanning equipment 102 is configured to scan a wafer in each of a multiplicity of perspectives. In particular, scanning equipment 102 includes an AOD. As described below in the description of FIG. 2, utilizing the AOD, scan data pertaining to a set of (two or more) preparation perspectives may be obtained substantially simultaneously, so that inter-perspective registration (i.e. registration between perspectives) is unnecessary (though alignment protocols, which are comparatively far less cumbersome, may nevertheless be required).

Scan data analysis module 104 is configured to (i) receive multi-perspective scan data obtained by scanning equipment 102, and (ii) perform an integrated analysis of the multi-perspective scan data, as described above in the Introduction and as further elaborated on below.

According to some embodiments, scanning equipment 102 includes a stage 112, a controller 114, an imager 116 (imaging device), and optical equipment 118. Scanning equipment 102 is delineated by a dashed-double-dotted box to indicate that components therein (e.g. stage 112 and imager 116) may be separate from one another, e.g. in the sense of not being included in a common housing.

Stage 112 is configured to have placed thereon a sample to be inspected, such as a wafer 120 (or a photomask). Wafer 120 may be patterned, but the skilled person will appreciate that system 100 may be utilized to detect defects also in bare wafers. According to some embodiments, stage 112 may be moveable, as elaborated on below. Imager 116 may include one or more light emitters (e.g. a visible and/or ultraviolet light source). Further, imager 116 may include one or more light detectors. Optical equipment 118 includes an AOD 122. Optical equipment 118 may further include optical filters (e.g. spatial filters, segmented pupils, polarizing filters, Fourier filters), beam splitters (e.g. polarizing beam splitters), mirrors, lenses, prisms, grids, deflectors, reflectors, apertures, and the like, configured to allow obtaining scan data pertaining to multiple perspectives. In particular, optical equipment 118 may include one or more electro-optic components configured to allow fast polarization modulation and/or (fast) rotation of a light beam.

Controller 114 may be functionally associated with stage 112, imager 116, and optical equipment 118, as well as with scan data analysis module 104. More specifically, controller 114 is configured to control and synchronize operations and functions of the above-listed modules and components during a scan of a wafer. For example, stage 112 is configured to support an inspected sample, such as wafer 120, and to mechanically translate the inspected sample along a trajectory set by controller 114, which also controls imager 116 and optical equipment 118. In particular, controller 114 is configured to control operation of AOD 122 and related optical components, such as to allow producing a beam train scanned along adjacent lines on the wafer, with each line scanned in a different perspective. Along each line the beam train may form a single illumination spot or an array of arbitrarily close illumination spots. The illumination spots in such an array may differ from one another in one or more optical parameters (characteristics) selected from relative phases, amplitudes, focus offsets, and/or wavefronts of the sub-beams generating the illumination spots, and, when the array includes at least three illumination spots, in the time-delay between adjacent illumination spots.

Scan data analysis module 104 includes computer hardware (one or more processors, such as image and/or graphics processor units, and volatile as well as non-volatile memory components; not shown). The computer hardware is configured to analyze multi-perspective scan data received from imager 116, of a scanned area on wafer 120, for presence of defects, as described below.

It is noted that system 100 may be operated without utilizing scan data analysis module 104, in which case multi-perspective scan data of a sample is obtained but not analyzed (at least not by system 100).

Scan data analysis module 104 may further include an analog-to-digital (signal) converter (ADC) and a frame grabber (not shown). The ADC may be configured to receive analog image signals from imager 116. Each analog image signal may correspond to a different perspective from a multiplicity of perspectives. The ADC may further be configured to convert the analog image signals into digital image signals, sort the digital image signals according to perspectives (as described below in the description of FIG. 2), and transmit the digital image signals to the frame grabber. The frame grabber may be configured to obtain from the digital image signals, digital images (block images or image frames) of scanned areas on a scanned wafer (e.g. wafer 120). Each digital image may be in one of the multiplicity of perspectives. The frame grabber may further be configured to transmit the digital images to one or more of the processors and/or memory components for multi-perspective analysis.

More specifically, scan data analysis module 104 may include a multi-perspective (MP) analysis module (not shown in FIG. 1) configured to perform an integrated analysis of multi-perspective scan data, wherein cross-perspective covariances are taken into account. According to some embodiments, the MP analysis module may be configured to:

Generate difference images of a scanned wafer area, in each of the multiplicity of perspectives, based on obtained scan data (e.g. received from imager 116) and reference data of the wafer area.

Generate sets of difference values, in each of the multiplicity of perspectives. Each set of difference values corresponds to a sub-area (e.g. a "pixel") of the scanned wafer area and includes a difference value corresponding to the sub-area and difference values corresponding to sub-areas neighboring the sub-area. Each difference value, in a given perspective, is derived from, and/or characterizes, a sub-image (e.g. a pixel) of the sub-area in a corresponding difference image (i.e. a difference image in the given perspective).

For each sub-area, determine whether the sub-area is defective based at least on the corresponding set of difference values and a respective set of noise values.

As used herein, according to some embodiments, a sub-area (e.g. corresponding in size to a pixel or a small group of pixels) is said to be "defective" when including a defect or a part of a defect.

According to some embodiments, the MP analysis module may be configured to, for each set of difference values, and, based at least thereon, generate the corresponding set of noise values. According to some embodiments, the generation of the set of noise values may be based at least on scan data obtained in a preliminary scan(s) of the wafer, wherein representative regions of the wafer are scanned.

According to some embodiments, the determination of whether the sub-area is defective, may be implemented taking into account the type of defect(s) the sub-area is suspected of including or partially including. In particular, the determination may involve computation of a covariance matrix, and may further include computations involving a predetermined kernel—which characterizes the signature of the suspected type of defect(s) in essentially the absence of wafer noise—and a corresponding threshold.

According to some embodiments, scan data analysis module 104 may be further configured to, upon determining a presence of a defect, (i) determine whether the defect is a defect of interest, and, optionally, when the defect is determined to be of interest, (ii) classify the defect.

It is noted that (some of the) off-diagonal terms in the covariance matrix include cross-perspective covariances (both between sub-images corresponding to different (neighboring) sub-areas as well as sub-images corresponding to a same sub-area).

As used herein, the term "difference image" is used in a broad sense and may refer to any set of derived values obtained by jointly manipulating two sets of values: a first set of values (obtained during a scan) and a second set of values (reference values obtained from reference data), such that each derived value in the set corresponds to a sub-area (e.g. a pixel) of a scanned region on the wafer. The joint manipulation may involve any mathematical operations on the two sets of values such that the (resulting) set of derived values may reveal differences, if present, between the two sets of values, or, more generally, may distinguish between the two sets of values. (The mathematical operations may or may not include subtraction.) In particular, the joint manipulation is not limited to manipulation of corresponding pairs of values. That is, each (difference) value in the set of difference values may result from joint manipulation of a plurality of values in the first set and a plurality of values in the second set.

As used herein, the term "reference data" should be expansively construed to cover any data indicative of the physical design of a (patterned) wafer and/or data derived from the physical design (e.g. through simulation). According to some embodiments, "reference data" may include, or consist of, "design data" of the wafer, such as, for example, the various formats of CAD data.

According to some embodiments, the reference data may include reference images that have been obtained, for example, in scanning of the wafer or a wafer fabricated to have the same design, or generated based on design data of the wafer such as CAD data.

Additionally, or alternatively, "reference data" may include, or consist of, data obtained by fully or partially scanning the wafer, e.g. during recipe setup or even in runtime. For example, scanning of one die, or multiple dies having the same architecture, during runtime may serve as reference data for another die of the same architecture. Further, a first wafer fabricated to a certain design, may be scanned during recipe setup and the obtained scan(s) data may be processed to generate reference data or additional reference data for subsequently fabricated wafers of the same design (as the first wafer). Such "self-generated" reference data is imperative when design data are not available but may also be beneficial even when design data are available.

As used herein, according to some embodiments, the terms "difference value(s)"—in reference to a sub-image—and "pixel value(s)"—in reference to the same sub-image—may be used interchangeably when the sub-image is a pixel.

Figure 2:
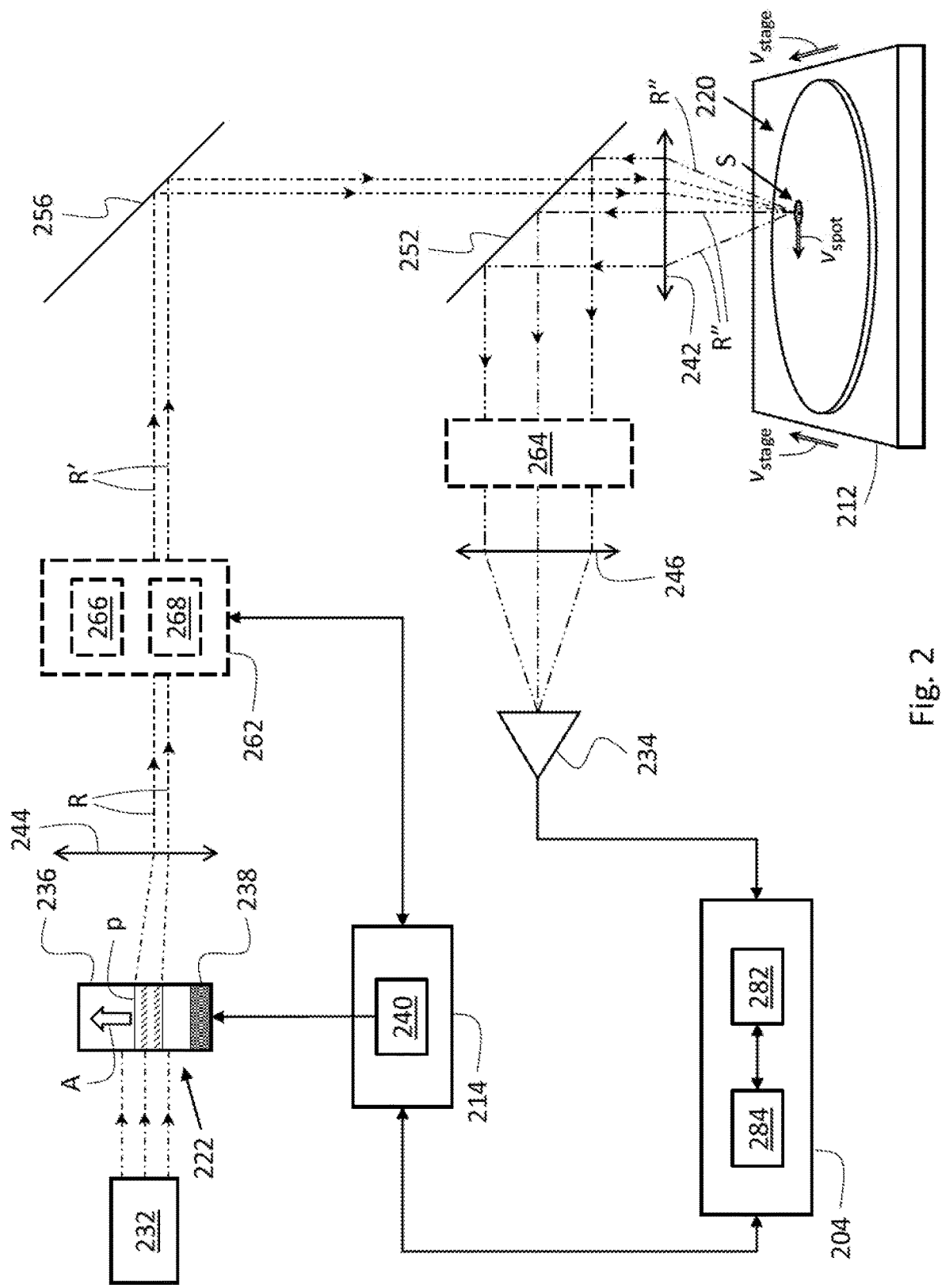
FIG. 2 schematically depicts a block diagram of a computerized system for obtaining and analyzing multi-perspective scan data of a sample (also depicted), the computerized system being a specific embodiment of the computerized system of FIG. 1.

FIG. 2 schematically depicts a computerized system 200 for obtaining and, optionally, analyzing multi-perspective scan data of a sample, according to some embodiments. System 200 constitutes a specific embodiment of system 100. System 200 includes a light source 232 and at least one (light) detector 234. Light source 232 and at least one detector 234 form part of (or constitute) an imager, which is a specific embodiment of imager 116. According to some embodiments, light source 232 is a laser source. System 200 further includes an AOD 222, which is a specific embodiment of AOD 122. According to some embodiments, AOD 222 includes an acousto-optic medium 236 and an electroacoustic transducer 238 mechanically coupled to acousto-optic medium 236. According to some embodiments, acousto-optic medium 236 may be cuboid-like shaped and made of a material such as glass or quartz. According to some embodiments, electroacoustic transducer 238 is a piezoelectric transducer.

According to some embodiments, AOD 122 may further include a beam trap (not shown), positioned adjacently to acousto-optic medium 236 in opposite to electroacoustic transducer 238. The beam trap may be configured to prevent reflectance of the induced acoustic pulses of the side of acousto-optic medium 236 opposite to electroacoustic transducer 238.

System 200 further includes a controller 214, which is a specific embodiment of controller 114. Controller 214 includes a waveform generator 240 (i.e. a signal generator). According to some embodiments, waveform generator 240 is an arbitrary waveform generator. Waveform generator 240 is electrically coupled to electroacoustic transducer 238, such as to induce acoustic vibrations in electroacoustic transducer 238. Due to the mechanical coupling between electroacoustic transducer 238 and acousto-optic medium 236, the induced acoustic vibrations lead to the formation of sound waves (i.e. compression waves) within acousto-optic medium 236. In particular, in embodiments wherein electroacoustic transducer 238 is a piezoelectric transducer, waveform generator 240 may be configured to apply an oscillating voltage across electroacoustic transducer 238, which, due to the inverse piezoelectric effect, induces mechanical vibrations in electroacoustic transducer 238 (which in turn induce sound waves in acousto-optic medium 236). Also indicated is a stage 212 on which an inspected wafer 220 is placed.

System 200 further includes optical equipment, which is a specific embodiment of optical equipment 118, and includes an objective lens 242, and, optionally, one or more of a collimating lens 244, a tube lens 246, a beam splitter 252, and a mirror 256. Optionally, according to some embodiments, the optical equipment may further include an illumination control module(s) 262 and/or a collection control module(s) 264. According to some embodiments, illumination control module 262 may include a (first) optical mask 266 positioned on the illumination pupil. Additionally, or alternatively, according to some embodiments, illumination control module 262 may include a fast polarization control unit 268. According to some embodiments, the working principle of fast polarization control unit 268 may be based on the electro-optic effect. In such embodiments, fast polarization control unit 268 includes an electro-optic crystal.

It is noted that when fast polarization control is not required, illumination control module 262 may include "standard" polarization filters (e.g. a wire-grid polarizer, or a Wollaston prism; not shown) in place of fast polarization control unit 268). According to some embodiments, illumination control module 262 may include both fast polarization control unit 268 and standard polarization filters. According to some embodiments, collection control module 264 may include a (second) optical mask positioned on the collection pupil. Additionally, or alternatively, according to some embodiments, collection control module 264 may include one or more polarization filters.

Controller 214 is configured to control and coordinate operation of the various components of system 200, such as the motion of stage 212, the timing and shape of the waveforms produced by waveform generator 240, the operation of illumination control module 262 (e.g. the electrical fields applied on the electro-optic crystal to manipulate the polarization of an input light beam to a desired polarization), and so on.

According to some embodiments, and as depicted in FIG. 2, system 200 may further include a scan data analysis module 204, which is a specific embodiment of scan data analysis module 104. Scan data analysis module 204 includes an image separation module 282 (the function of which is described below) and an MP analysis module 284 (which is a specific embodiment of the MP analysis module of scan data analysis module 104).

Scan data analysis module 204 may be communicatively associated with controller 214. In particular, prior to the start of a scan, scan data analysis module 204 may send scanning instructions (i.e. the scanning "recipe") to controller 214. Controller 214 may be configured to send to scan data analysis module 204, in real-time or near real-time, information relating to the generation and travel of the acoustic pulses (e.g. chirps) within acousto-optic medium 236. In particular, the information may specify the times at which the acoustic pulses are generated, the time taken for each acoustic pulse to travel across acousto-optic medium 236, and so on. This information may then be used by image separation module 282 in sorting scan data (received from detector(s) 234), such as to produce images in each of the perspectives, as described below. According to some embodiments, wherein illumination control module 262 includes fast polarization control unit 268, switching times between different polarizations may also be relayed to scan data analysis module 204.

It is noted that system 200 may be operated without utilizing MP analysis module 284 or even without utilizing scan data analysis module 204, in which case multi-perspective scan data of a sample is obtained but not analyzed (at least not by system 200).

Light source 232 is configured to generate a beam of monochromatic light, which is incident on acousto-optic medium 236. According to some embodiments, light source 232 may be configured to generate a beam of polarized, monochromatic light (i.e. a coherent light beam). According to some embodiments, light source 232 may be a laser source. Waveform generator 240 may be configured to repeatedly apply a series of frequency-modulated voltage pulses across electroacoustic transducer 238, such as to initiate the scanning of beam trains along consecutive lines on a slice of a sample, such as wafer 220.

Further indicated by arrows are a velocity $v_{spot}$ of an illumination spot S, produced on wafer 220, and a velocity $v_{stage}$ of stage 212. It is noted that the direction of $v_{spot}$ and the direction of $v_{stage}$ are orthogonal, or substantially orthogonal. In particular, illumination spot S is scanned transversely (i.e. along a line), while stage 212 is translated along a slice (including the scanned line).

In greater detail, each of the voltage pulses respectively induces acoustic vibrations within electroacoustic transducer 238, which are translated into a respective frequency-modulated acoustic pulse (e.g. a chirp) propagating along the length of acousto-optic medium 236. The waveforms of the voltage pulses (or, what amounts to the same thing, the shapes of the acoustic pulses) are selected such that each acoustic pulse focuses (monochromatic) light rays passing through acousto-optic medium 236 in the segment thereof wherein the acoustic pulse is presently localized. The focused light rays form a light beam, which travels along with the acoustic pulse. Each of the acoustic pulses thus constitutes a "traveling lens". This is visualized in FIG. 2 by a frequency-modulated acoustic pulse p, which propagates along the length of acousto-optic medium 236 (as indicated by a propagation arrow A).

In particular, the traveling lens determines the velocity (e.g. $v_{spot}$ in FIG. 2) of an illumination spot, or an array of illumination spots, formed thereby on along a single line (i.e. one line at a time) on a slice of a sample. That is, the velocity at which the illumination spot or the array travels along the length of the line. This velocity is proportional to the (travel) speed of the traveling lens, which is equal to the propagation speed of the respective acoustic pulse within the acousto-optic medium.

The number of voltage pulses in the series may equal the number of perspectives in which the sample is to be scanned. More specifically, the number of voltage pulses may equal the number of preparation perspectives. As elaborated on below, collection control module 264 may be employed to increase the number of perspectives (e.g. double the number of perspectives when each preparation perspective may be combined with one of a pair of collection perspectives).

According to some embodiments, at least one of the voltage pulses may differ from the rest of the voltage pulses in the series such as to lead to the formation of a respective light beam differing in at least one optical parameter from the rest of the light beams. That is, in such embodiments, AOD 222 is configured to prepare light beams in at least two perspectives (the number of preparation perspectives may nevertheless be greater than two as described below). According to some embodiments, each of the voltage pulses leads to the formation of a respective light beam differing in at least one optical parameter from the rest of the light beams. That is, in such embodiments, AOD 222 is configured to prepare light beams in n different perspectives, wherein n is the number of (preparation) perspectives.

According to some embodiments, AOD 222 may be configured for stereo-imaging. More precisely, waveform generator 240 may be configured to produce a series of voltage pulses leading to a first (or "right") half and a second (or "left") half of the illumination pupil being alternately illuminated, such as to allow for the production of stereo images. More generally, any two different parts of the illumination pupil may be alternately illuminated (which, in particular, may be of different sizes and/or non-complementary).

According to some embodiments, wherein illumination control module 262 is included (in system 200), the preparation perspectives may additionally or uniquely be determined or set by illumination control module 262. More specifically, a light beam, generated by an acoustic pulse in acousto-optic medium 236, travels towards collimating lens 244, which is configured to collimate the light beam. The (collimated) light beam (indicated by light rays R) is directed towards illumination control module 262. The light beam may be optically "manipulated" by illumination control module 262. The light beam exiting illumination control module 262 (i.e. the output light beam) are indicated by light rays R'. The prime suffix serves to indicate that the output light beam, in some embodiments, may differ from the input light beam by one or more optical parameters.

According to some embodiments, fast polarization control unit 268 (in embodiments wherein fast polarization control unit 268 is included) may be configured to modulate (e.g. convert linear polarization into circular polarization) and/or rotate the polarization of input light beams, such that output light beams may differ in the polarization states thereof. In such embodiments, the switching times between polarizations of fast polarization control unit 268 may be synchronized with waveform generator 240, so that consecutive lines, or consecutive groups of (consecutive) lines, are alternately scanned by light beams having different polarization states, respectively.

For example, according to some embodiments, odd-numbered lines may be scanned in a first polarization, while even-numbered lines may be scanned in a second polarization. Or, for example, according to some embodiments, lines numbered 4n–3 and 4n–2 may be scanned in a first polarization, and lines numbered 4n–1 and 4n may be scanned in a second polarization (n=1, 2, 3, . . . , N, with 4N being the total number of lines). In particular, according to some such example embodiments, lines numbered 4n–3 may be scanned in a first preparation perspective, which is a combination of the first polarization and e.g. a first focus offset; lines numbered 4n–2 may be scanned in a second preparation perspective, which is a combination of the first polarization and e.g. a second focus offset; lines numbered 4n–2 may be scanned in a third preparation perspective, which is a combination of the second polarization and e.g. the first focus offset; and lines numbered 4n may be scanned in a fourth preparation perspective, which is a combination of the second polarization and e.g. the second focus offset.

According to some embodiments, the preparation perspectives may be determined by both of AOD 222 and illumination control module 262. According to some embodiments, one or more optical parameters of a set of optical parameters, characterizing a given perspective, may be set by AOD 222, while the rest of the optical parameters in the set of optical parameters may be set by illumination control module 262. For example, a focus offset, wavefront, and/or intensity of a light beam may be determined by AOD 222, while a polarization of the light beam may be determined by fast polarization control unit 268. On exiting illumination control module 262—or, in embodiments wherein illumination control module 262 is not included, after being collimated—the light beam may be relayed to objective lens 242 via beam splitter 252. (According to some embodiments, additional optical components may be involved in relaying the light beam to objective lens 242, such as—and as depicted in FIG. 2—mirror 256.)

Objective lens 242 is configured to focus the light beam on the sample, such as to form an illumination spot thereon (such as illumination spot S on wafer 220). The illumination spot is scanned along a respective line on a slice on the sample, as elaborated on below. More specifically, the propagation of the acoustic pulse (from which the light beam originates) along the length of acousto-optic medium 236 translates into a motion of the illumination spot along a line on a slice on the sample.

Light rays R" returned from the wafer (e.g. scattered off the wafer) are collected and collimated by objective lens 242 such as to form a returned light beam. The returned light beam may be directed towards beam splitter 252, wherefrom the returned light beam is reflected towards detector(s) 234.

According to some embodiments, the scanning equipment includes a plurality of detectors (i.e. at least one detector 234 includes a plurality of detectors) as well as collection control module 264. In such embodiments, after being reflected off beam splitter 252, the returned light rays first pass through collection control module 264, wherein the returned light beam is separated (e.g. filtered) into a plurality of sub-beams characterized by different collection perspectives. That is, each detector is configured to sense a respective sub-beam output by collection control module 264. Each of the sub-beams may differ from the rest of the sub-beams by one or more optical parameters. Thus, each detector may correspond to a different collection perspective.

More generally, when the number of perspectives is greater than the number of preparation perspectives (i.e. when the number of collection perspectives equals two or more), the scanning equipment may include more than a single detector.

According to some embodiments, collection control module 264 may include a segmented pupil positioned on, or substantially on, the pupil plane (of objective lens 242). The segmented pupil may be partitioned into a plurality of pupil segments (or apertures). The segmentation of the pupil allows to separate the returned light rays, arriving at the pupil, into sub-beams, according to the respective return angle of each of the sub-beams. Each of the perspectives generated by the segmented pupil may thus correspond to a different collection angle.

Additionally, or alternatively, according to some embodiments, collection control module 264 may include a polarizing beam splitter, configured to split the returned light beam into two sub-beams of orthogonal polarizations. Each of the two sub-beams output by the polarizing beam splitter may be directed towards a respective detector.

According to some embodiments, not depicted in FIG. 2, the scanning equipment may include an additional detector(s) configured to sense grayfield scattered light (while detector(s) 234 may be configured to sense brightfield scattered light). According to some embodiments, not depicted in the figures, the scanning equipment may be configured for sensing only grayfield scattered light. As used herein, according to some embodiments, the term "grayfield scattered light" is used in a broad sense to refer to non-brightfield reflected light. In particular, according to some embodiments, the term "grayfield scattered light" may be used to refer also to darkfield scattered light. Further, it is noted that brightfield and grayfield collection channels correspond to different collection perspectives.

Figure 5A:
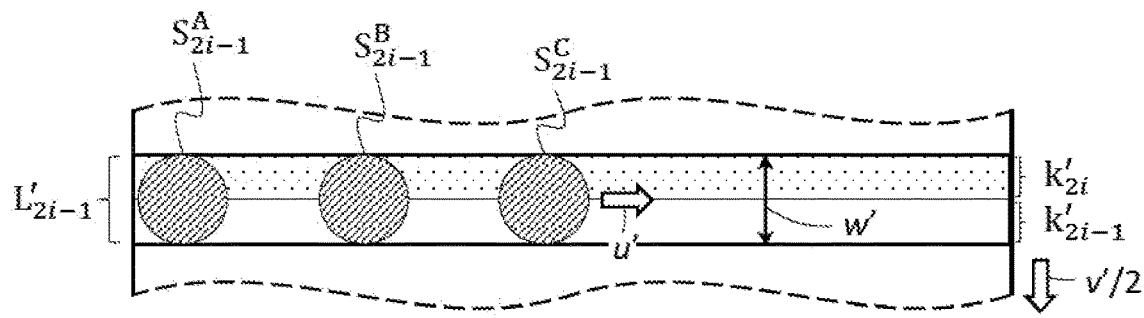
FIGS. 5A and 5B schematically depict a two-perspective scan of a slice on a wafer, wherein each perspective is obtained by scanning a respective array of three proximate illumination spots along a respective set of lines, according to some embodiments.
Figure 5B:
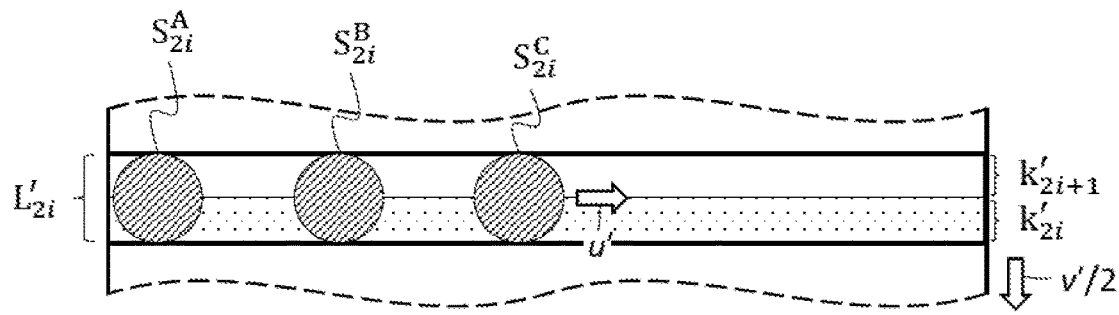
Figure 6A:
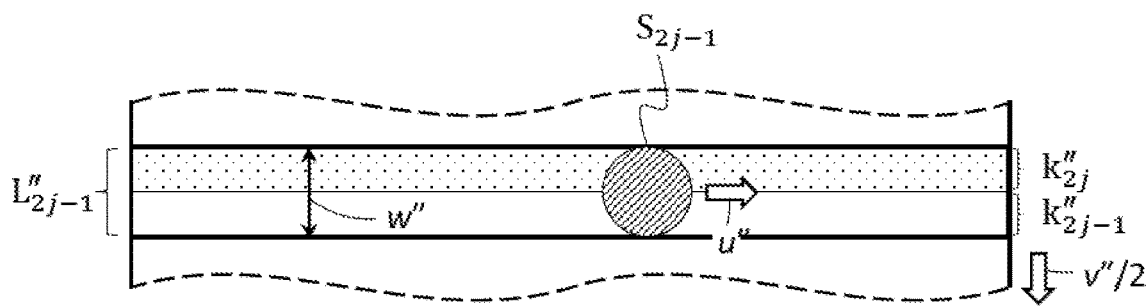
FIGS. 6A and 6B schematically depict a two-perspective scan of a slice on a wafer, wherein a first perspective is obtained by scanning a single illumination spot along a first set of lines, and a second perspective is obtained by scanning an array of two proximate illumination spots along a second set of lines, according to some embodiments.
Figure 6B:
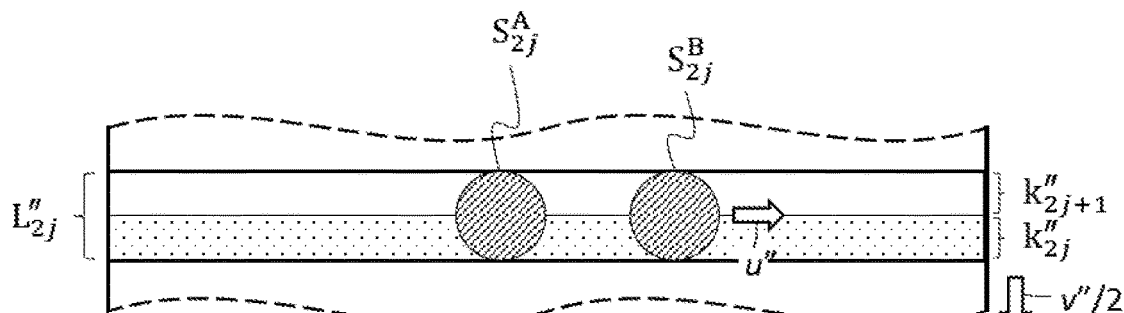

According to some embodiments, waveform generator 240 and AOD 222 may be configured to allow generating a beam train, wherein one or more of the beams includes a plurality of close sub-beams, such as to produce an array of close (proximate) illumination spots (as depicted, for example, in FIGS. 5A, 5B, and 6B). The array is scanned along a line on a slice of the sample. The illumination spots in the array may be so spaced such that an interference pattern (i.e. a pattern of interference fringes) is formed at detector(s) 234. The interference pattern may be indicative of the structure of the wafer, i.e. the "topography" of the wafer surface and the constitution (composition) thereof and of underlying layers (layers below the wafer surface). The interference pattern may facilitate detection of potential defects (when the actual (measured) structure differs from the intended structure, e.g. as specified by design data).

More specifically, according to some embodiments, waveform generator 240 may be configured to generate a voltage pulse including two or more closely (temporally) separated voltage sub-pulses, such as to induce within acousto-optic medium 236 an acoustic pulse including (two or more) closely spaced acoustic sub-pulses, which propagate along the length of acousto-optic medium 236. According to some embodiments, the distance between adjacent illumination spots in an array, generated thereby, may be no greater than about ten pixels, so as to allow for the formation of a well-defined interference pattern. According to some embodiments, illumination spots in an array may differ from one another in one or more optical parameters. For example, in an array of two illumination spots, the illumination spots may differ from one another in phase (such that the phase difference there between differs from a multiple of $2\pi$).

More generally, illumination spots in an array may differ from one another in the relative phases, amplitudes, focus offsets, and/or wavefronts of the sub-beams generating the illumination spots.

Referring to each of systems 100 and 200, in operation, given that n preparation perspectives are selected, the controller (i.e. controller 114 or 214) "partitions" a slice on a sample into n sets of adjacent lines. Each set is then scanned in a respective perspective. The sets overlap, with each set fully, or substantially fully (as explained below), covering the slice.

In greater detail, according to some embodiments, if in a single-perspective scan (effected using system 100 or system 200) the longitudinal component of the relative velocity between the stage and the beam (e.g. the stage velocity), formed on the wafer by the AOD (e.g. AOD 122 or AOD 222), is given by v, then in a scan, including n preparation perspectives, the longitudinal component of the relative velocity may be reduced to, or substantially reduced to, v/n. It is emphasized, however, that the line width (i.e. the width of the lines, which equals at least the height of a pixel) remains unchanged, and in particular, is not reduced. Consequently, the second set of lines (i.e. the set of lines scanned in the second preparation perspective) is longitudinally shifted by w/n with respect to the first set of lines, wherein w is the line width (e.g. a pixel). More generally, the (m+1)-th set of lines ($2 \leq m \leq n-1$) is longitudinally shifted by m·w/n with respect to the first set of lines and by w/n (e.g. by one n-th of a pixel) with respect to the m-th set of lines. In particular, the n-th set of lines is longitudinally shifted by (n−1)·w/n with respect to the first set of lines, so that the maximum shift between sets measures less than w (e.g. less than a pixel).

The above-described scanning sequence is visualized in FIGS. 3A-3C, for the case n=3, according to some embodiments. More specifically, FIGS. 3A-3C depict raster scanning of a slice 300 on a wafer using a computerized system such as system 100 or system 200, according to some embodiments. FIG. 3A depicts a first set of lines scanned in a first preparation perspective. FIG. 3B depicts a second set of lines scanned in a second preparation perspective. FIG. 3C depicts a third set of lines scanned in a third preparation perspective. Each line is numbered according to the order in which the lines are scanned. Thus, a first line $L_1$, which is the first (or bottommost in FIG. 3A) line in the first set of lines is scanned first. A second line $L_2$, which is the first (or bottommost FIG. 3B) line in the second set of lines is scanned second. A third line $L_3$, which is the first (or bottommost FIG. 3C) line in the third set of lines is scanned third. More generally, an m-th line $L_m$ is the line scanned m-th.

Also indicated by arrows are the velocity $\mu$ of the illumination spots, and the velocity of the stage on which the wafer is placed (i.e. the longitudinal component of the relative velocity v/3 between the beam train (i.e. the illumination spots) and slice 300).

The order of the scanning is visualized as a series of operations in FIG. 4. In a first operation 410, line $L_1$ is scanned in the first preparation perspective. In a second operation 420, line $L_2$ is scanned in the second preparation perspective. At the start of second operation 420, the stage (e.g. stage 112 or stage 212) has been (longitudinally) shifted by a distance of w/3 (e.g. a third of the height of a pixel) relative to the position thereof at the start of first operation 410. In a third operation 430, line $L_3$ is scanned in the third preparation perspective. At the start of third operation 430, the stage has been shifted by a distance of 2·w/3 relative to the position thereof at the start of first operation 410.

In a fourth operation 440, a line $L_4$ is scanned in the first preparation perspective. At the start of the fourth operation the stage has been shifted by a full line (e.g. the height of a pixel) relative to the position thereof at the start of first operation 410. In a fifth operation 450, a line $L_5$ is scanned in the second preparation perspective. At the start of the fifth operation the stage has been shifted by a distance of w/3 relative to the position thereof at the start of fourth operation 440. In a sixth operation 460, a line $L_6$ is scanned in the third preparation perspective. At the start of sixth operation 460, the stage has been shifted by 2·w/3 relative to the position thereof at the start of fourth operation 440, and so on. Referring again to FIGS. 3A-3C, in greater detail, FIG. 3A is depicted at a time t=t', FIG. 3B is depicted at a time t=t'+Δt, and FIG. 3C is depicted at a time t=t'+2·Δt. Here Δt=T/3, wherein T=w/v is the time it takes to translate the stage by a single line (i.e. a distance equal to the line width w). Thus, at the time t=t' only a line $L_7$ (pertaining to the first set) is being scanned. At the time t=t'+Δt only a line $L_8$ (pertaining to the second set) is being scanned. At the time t=t'+2·Δt only a line $L_9$ (pertaining to the third set) is being scanned. A first illumination spot $S_1$, corresponding to the first (preparation) perspective, is shown scanned along line $L_7$ at the time t=t'. A second illumination spot $S_2$, corresponding to the second (preparation) perspective, is shown scanned along line $L_8$ at the time t=t'+Δt. A third illumination spot $S_3$, corresponding to the third (preparation) perspective, is shown scanned along line $L_9$ at the time t=t'+2·Δt.

Also indicated are three lateral strips $k_A$, $k_B$, and $k_C$, each of width w/3, which partition line $L_8$ into three equal parts. Strips $k_A$ and $k_B$ are also included in line $L_7$. Strips $k_B$ and $k_C$ are also included in line $L_9$. In particular, strip $k_B$ is included in each of lines $L_7$, $L_8$, and $L_9$. Thus, strip $k_B$ is scanned by each of illumination spots $S_1$, $S_2$, and $S_3$. More generally, except two strips at the top fringe and two strips at the bottom fringe of slice 300 (i.e. strips $k_1$ and $k_2$), the rest of the strips (e.g. strips $k_3$, $k_4$, and $k_5$, and strips $k_A$, $k_B$, and $k_C$) are each scanned by three different spots in each of the three (preparation) perspectives. In other words, slice 300 is fully, or substantially fully, scanned in each of the three perspectives.

Since lines are alternately scanned in different perspectives, the resulting scan data may have to be sorted such as to produce images in each of the perspectives. In scan data analysis module 204, image separation module 282 is "assigned" this task. More specifically, image separation module 282 may include an ADC and a frame grabber (as described above in the description of scan data analysis module 104) and processing and memory circuitry configured to: (i) assign obtained scan data to respective lines, (ii) sort the scan data into different sets (i.e. each set corresponding to a different perspective), (iii) order the scan data in each set by the line numbers, and (iv) combine the scan data in each set such as to obtain image frames in the corresponding perspective.

FIGS. 5A and 5B depict raster scanning of a slice 500 on a wafer using a computerized system such as system 100 or system 200, wherein each line is scanned by an array of close illumination spots, according to some embodiments. To make the discussion more concrete and facilitate the description, it is assumed that slice 500 is alternately scanned by a first array of illumination spots, which corresponds to a first preparation perspective, and a second array of illumination spots, which corresponds to a second preparation perspective. Further, it is assumed that each array includes three illumination spots.

Slice 500 is thus partitioned into two sets of lines: a first set of lines, which is scanned in the first perspective and includes odd-numbered lines, and a second set of lines, which is scanned in the second perspective and includes even-numbered lines. The lines all have a same line width w'. The two sets of lines substantially fully overlap, with each pair of consecutive lines (partially) overlapping along a strip which measures half the area of each the lines (i.e. the strips are of width w'/2). The lines are scanned consecutively according to their numbering.

The scanning is effected by longitudinally translating the wafer at a speed v'/2 (indicated by vertical arrows). Here v' is the speed at which the wafer would be translated if slice 500 were scanned in only one of the perspectives, e.g. only by the first array of illumination spots. μ' (indicated by horizontal arrows) is the velocity at which each of the arrays of illumination spots is scanned along a line, and is determined by the propagation speed of the acoustic pulses, generating the arrays of spots, within the acousto-optic medium of the AOD (e.g. acousto-optic medium 236 of AOD 222).

Referring to FIG. 5A, depicted is a line $L_{2i-1}'$ (i≥1). Line $L_{2i-1}'$ is partitioned into two strips: a strip $k_{2i-1}'$ and a strip $k_{2i}'$ positioned above strip $k_{2i-1}'$. Line $L_{2i-1}'$ is shown scanned by three illumination spots from the first array of spots: a first illumination spot $S_{2i-1}^A$, a second illumination spot $S_{2i}^B$, and a third illumination spot $S_{2i-1}^C$.

Referring to FIG. 5B, depicted is a line $L_{2i}'$ (which is the next line scanned after line $L_{2i-1}'$). Line $L_{2i}'$ is partitioned into two strips: strip $k_{2i}'$ and a strip $k_{2i+1}'$ positioned above strip $k_{2i}'$. Line $L_{2i}'$ is shown scanned by three illumination spots from the second array of spots: a first illumination spot $S_{2i}^A$, a second illumination spot $S_{2i}^B$, and a third illumination spot $S_{2i}^C$.

Strip $k_{2i}'$ is common to both lines $L_{2i-1}'$ and $L_{2i}'$ and is scanned both by the first array of illumination spots and the second array of illumination spots. Similarly, each strip—except the bottom strip of the first line (i.e. line $L_1'$), and the top strip of the top line—is scanned in both the first perspective and the second perspective, essentially as described above in the description of FIGS. 3A-4.

The illumination spots in each array may differ from one another in phase, amplitude, focus offsets, and/or wavefronts of the sub-beams generating the illumination spots. According to some embodiments, the distance between adjacent illumination spots (e.g. spots $S_{2i-1}^A$ and $S_{2i-1}^B$) in each array may be no greater than about 10 pixels. In particular, the length of each array may be such that a (sufficiently clear) respective interference pattern is formed at the detector(s) (e.g. detector(s) 234). The interference patterns may be indicative of the structure and composition of a scanned wafer surface, and as such may be indicative of the presence of potential defects.

FIGS. 6A and 6B depict raster scanning of a slice 600 on a wafer using a computerized system such as system 100 or system 200, wherein some lines are scanned by a single illumination spot and some lines are scanned by an array of close illumination spots, according to some embodiments. To make the discussion more concrete and facilitate the description, it is assumed that slice 600 is alternately scanned by a single illumination spot, which corresponds to a first preparation perspective, and an array of two illumination spots, which corresponds to a second preparation perspective.

Slice 600 is thus partitioned into two sets of lines: a first set of lines, which is scanned in the first perspective and includes odd-numbered lines, and a second set of lines, which is scanned in the second perspective and includes even-numbered lines, as described above with respect to slice 500. The lines all have a same line width w".

The scanning is effected by longitudinally translating the wafer at a speed v"/2 (indicated by vertical arrows). Here v" may be the speed at which the wafer would be translated if slice 600 were scanned in only one of the perspectives. μ" (indicated by horizontal arrows) is the velocity at which each of the single illumination spot and the array of two illumination spots is scanned along a line, and is determined by the propagation speed of the acoustic pulses (which may be the same for both perspectives) within the acousto-optic medium of the AOD.

Referring to FIG. 6A, depicted is a line $L_{2j-1}"$ ($j \geq 1$). Line $L_{2j-1}"$ is partitioned into two strips: a strip $k_{2j-1}"$ and a strip $k_{2j}"$ positioned above strip $k_{2j-1}"$. Line $L_{2j-1}"$ is shown scanned by an illumination spot $S_{2j-1}$.

Referring to FIG. 6B, depicted is a line $L_{2j}"$. Line $L_{2j}"$ is partitioned into two strips: strip $k_{2j}"$ and a strip $k_{2j+1}"$ positioned above strip $k_{2j}"$. Line $L_{2j}"$ is shown scanned by an array of two illumination spots: a first illumination spot $S_{2j}^A$ and a second illumination spot $S_{2j}^B$.

Strip $k_{2j}"$ is common to both lines $L_{2j-1}"$ and $L_{2j}"$ and is scanned by both the illumination spot $S_{2j-1}$ and the array of two illumination spots (including illumination spots $S_{2j}^A$ and $S_{2j}^B$). Similarly, each strip except the bottom strip of the first line (i.e. line $L_1"$), and the top strip of the top line, is scanned in both the first perspective and the second perspective, essentially as described above the description of FIGS. 3A-4.

Methods

According to an aspect of some embodiments, there is provided a method for obtaining multi-perspective scan data of a sample (e.g. a wafer or a photomask). FIG. 7 presents a flowchart of such a method, a method 700, according to some embodiments. Method 700 may be implemented using system 100, system 200, or systems similar thereto, as described above in the Systems subsection. Method 700 includes:

An operation 710, wherein an AOD (e.g. AOD 122 or AOD 222) is employed to generate a beam train, which is sequentially scanned along a first group of $n \geq 2$ lines on a slice on a sample. Each line is scanned in a respective perspective from a multiplicity of perspectives, which may include n distinct preparation perspectives. Starting from the second line, each line is displaced by d/n with respect to the last scanned line, wherein d is the line width, that is, the width of the lines (e.g. the height of a pixel).

An operation 720, wherein operation 710 is repeated with respect to N−1 groups of lines on the slice, such that each line in an m-th group of lines ($2 \leq m \leq N$) is displaced by (m−1)·d with respect to a corresponding line in the first group of lines (e.g. the second line in the m-th group is displaced by (m−1)·d with respect to the second line in the first group).

An optional operation 730, wherein operations 710 and 720 are repeated with respect to one or more additional slices on the sample.

It is noted that consecutively scanned lines are longitudinally displaced relative to one another, such as to overlap in, or substantially in, 100·(n−1)/n % of widths thereof. Hence, in operations 710 and 720, when the groups of lines fully cover the slice, the slice is fully, or substantially fully, scanned in each of the n preparation perspectives. Such a scanning pattern may be achieved by reducing the translation velocity of the stage (whereon the sample is placed) by a factor of n as compared to when scanning in a single perspective.

According to some embodiments, along each scanned line the beam train forms a single illumination spot (as depicted, for example, in FIGS. 3A-3C). According to some alternative embodiments, along at least some of the scanned lines the beam train forms an array (e.g. a linear) array of proximate illumination spots (as depicted, for example, in FIGS. 5A and 5B or in FIG. 6B). According to some such embodiments, adjacent spots in the array are separated by less than about ten pixels.

The n preparation perspectives may include any of the preparation perspectives specified above in the Systems subsection. At least some of the preparation perspectives may be combined with at least two collection perspectives, such that scan data in q distinct perspectives is obtained, wherein q>n. In particular, according to some embodiments, when each of the preparation perspectives can be, and is, combined with each of the collection perspectives, scan data in q=m·n perspectives are obtained, wherein m is the number of collection perspectives.

According to an aspect of some embodiments, there is provided a method for obtaining and analyzing multi-perspective scan data of a sample (e.g. a wafer or a photomask). The method may be implemented using system 100, system 200, or systems similar thereto. According to some embodiments, the method includes:

An operation, wherein multi-perspective scan data of a region of a sample is obtained by implementing method 700.

An operation, wherein the obtained scan data are subjected to an integrated analysis, which takes into account cross-perspective covariances between different perspectives (as described above in the description of the operation of scan data analysis modules 104 and 204).

While the disclosure has focused on scanning and inspection of wafers, it will be clear to the skilled person that the disclosed methods and systems are applicable also for detecting irregularities in photomasks used in wafer fabrication ("mask inspection"), as well as in reticles used in wafer fabrication.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations of methods according to some embodiments may be described in a specific sequence, methods of the disclosure may include some or all of the described operations carried out in a different order. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A computerized system for obtaining multi-perspective scan data of a sample, the system comprising scanning equipment, which comprises:
    a light source configured to generate at least one light beam;
    an acousto-optic deflector (AOD) configured to focus the at least one light beam such as to generate a beam train scanned along consecutive lines on a slice, in groups of n≥2 successively scanned lines, along each of which lines the beam train forms at least one illumination spot, respectively; and
    one or more detectors configured to sense light returned from the slice;
    wherein the n≥2 lines are scanned in different perspectives, respectively, from a multiplicity of perspectives; and
    wherein consecutive lines are longitudinally displaced relative to one another, such as to overlap in, or substantially in, 100·(n−1)/n % of widths thereof, so that the slice is fully, or substantially fully, scanned in each of the perspectives.

2. The system of claim 1, wherein the multiplicity of perspectives comprises at least n perspectives, each perspective defined by a compatible combination of a preparation perspective, selected from a group of at least n preparation perspectives, and a collection perspective selected from a group of one or more collection perspectives;
    wherein the at least n preparation perspectives are selected from an intensity of an illumination beam, a polarization of the illumination beam, an illumination wavefront, an illumination spectrum, a focus offset of the illumination beam, one or more maskings of the illumination beam, relative phase(s) between distinct sub-beams of the illumination beam, and compatible combinations thereof; and
    wherein the collection perspective is selected from an intensity of returned light, a polarization of returned light, a spectrum of returned light, a collection angle(s), a brightfield channel, a grayfield channel, one or maskings of the returned light, Fourier filtering of returned light, and a sensing type selected from intensity, phase, or polarization, and compatible combinations thereof.

3. The system of claim 1, wherein a longitudinal component of a relative velocity between the beam train and the sample is proportional to, or substantially proportional to, 1/n.

4. The system of claim 2, wherein the AOD comprises an acousto-optic medium and an electroacoustic transducer mechanically coupled to the acousto-optic medium;
    wherein the light source is configured to irradiate the acousto-optic medium with the at least one light beam; and
    wherein the scanning equipment further comprises a waveform generator electrically coupled to the electroacoustic transducer such as to allow generating a series of acoustic pulses traveling along the acousto-optic medium, each of the acoustic pulses being configured to focus a portion of the at least one light beam such as to produce an illumination spot, or an array of illumination spots, on a respective line from the n lines.

5. The system of claim 1, wherein the system further comprises a scan data analysis module configured to perform an integrated analysis of multi-perspective scan data obtained in the scan.

6. The system of claim 5, wherein the scan data analysis module is configured to sort image data of scanned lines according to respective perspectives thereof, such as to generate image frames in each of the multiplicity of perspectives.

7. The system of claim 5, wherein the integrated analysis comprises:
    computing, based on the obtained scan data, and/or estimating cross-perspective covariances; and
    determining presence of defects in the slice, taking into account the cross-perspective covariances.

8. The system of claim 7, wherein the integrated analysis further comprises, for each of a plurality of sub-areas of the slice:
    generating difference values in each of the multiplicity of perspectives based on the obtained scan data and corresponding reference data of the slice in each of the multiplicity of perspectives; and
    determining whether the sub-area is defective, based at least on the difference values corresponding to the sub-area and to sub-areas neighboring the sub-area, and noise values corresponding to the sub-area and to the neighboring sub-areas, the noise values comprising corresponding covariances from the cross-perspective covariances.

9. The system of claim 8, wherein the determining of whether each of the plurality of sub-areas is defective comprises:
    generating a covariance matrix comprising the noise values corresponding to the sub-area and the sub-areas neighboring the sub-area;
    multiplying a first vector, comprising the difference values corresponding to the sub-area and the neighboring sub-areas, by an inverse of the covariance matrix, to obtain a second vector;
    computing a scalar product of the second vector and a third vector, whose components comprise values characterizing a defect; and
    labeling the sub-area as defective if the scalar product is greater than a predetermined threshold.

10. The system of claim 4, further comprising a fast polarization control unit configured to allow alternately scanning consecutive lines, or groups of consecutive lines, in different polarizations, respectively, wherein the fast polarization control unit being positioned between the AOD and an objective lens of the system and comprising an electro-optic crystal.

11. The system of claim 1, wherein, along at least one of the n lines, an array of illumination spots is produced, the illumination spots in the array being positioned sufficiently closely to one another such as to generate a pattern of interference fringes at the one or more detectors of the scanning equipment.

12. The system of claim 11, wherein at least two illumination spots in the array differ from one another in one or more optical parameters.

13. A method for obtaining multi-perspective scan data of a sample, the method comprising:
obtaining scan data, in a multiplicity of perspectives, of a slice of a sample by utilizing an acousto-optic deflector (AOD) to generate a beam train, which is scanned along consecutive lines on the slice, in groups of n≥2 successively scanned lines, such that (i) along each line the beam train forms an illumination spot, or an array of illumination spots, respectively, and (ii) each line in each group of n≥2 lines is scanned in a respective perspective from the multiplicity of perspectives;
wherein consecutive lines are longitudinally displaced relative to one another, such as to overlap in, or substantially in, $100 \cdot (n-1)/n$ % of widths thereof, so that the slice is fully, or substantially fully, scanned in each of the perspectives.

14. The method of claim 13, wherein the multiplicity of perspectives comprises at least n perspectives, each perspective defined by a compatible combination of a preparation perspective, selected from a group of at least n preparation perspectives, and a collection perspective selected from a group of one or more collection perspectives;
wherein the at least n preparation perspectives are selected from an intensity of an illumination beam, a polarization of the illumination beam, an illumination wavefront, an illumination spectrum, a focus offset of the illumination beam, one or more maskings of the illumination beam, relative phase(s) between distinct sub-beams of the illumination beam, and compatible combinations thereof; and
wherein the collection perspective is selected from an intensity of returned light, a polarization of returned light, a spectrum of returned light, a collection angle(s), brightfield channel, grayfield channel, one or maskings of the returned light, Fourier filtering of returned light, and a sensing type selected from intensity, phase, or polarization, and compatible combinations thereof.

15. The method of claim 13, wherein a longitudinal component of a relative velocity between the beam train and the sample is proportional to, or substantially proportional to, $1/n$.

16. The method of claim 13, wherein the AOD comprises an acousto-optic medium and an electroacoustic transducer mechanically coupled to the acousto-optic medium;
wherein, in the obtaining of the scan data, (i) the acousto-optic medium is irradiated with at least one light beam, and (ii) a series of voltage pulses is applied across the electroacoustic transducer, thereby generating a series of acoustic pulses, which travel along the acousto-optic medium, each of the acoustic pulses being configured to focus a portion of the at least one light beam such as to produce an illumination spot, or an array of illumination spots, on a respective line from the n lines.

17. The method of claim 16, wherein a generation of at least one of the at least n preparation perspectives comprises passing the at least one light beam, or a portion thereof, through a fast polarization control unit, wherein the fast polarization control unit is configured to allow alternately scanning consecutive lines, or groups of consecutive lines, in different polarizations, respectively, and wherein the fast polarization control unit comprises an electro-optic crystal.

18. The method of claim 16, wherein, along at least one of the n lines, an array of illumination spots is produced, the illumination spots in the array being positioned sufficiently closely to one another such as to generate a pattern of interference fringes at one or more detectors whereto scattered light from the sample is relayed.

19. A method for obtaining and analyzing multi-perspective scan data of a sample, the method comprising:
obtaining scan data, in a multiplicity of perspectives, of a slice of a sample by implementing the method of claim 13; and
analyzing the obtained scan data by subjecting the scan data to an integrated analysis, which takes into account cross-perspective covariances between different perspectives from the multiplicity of perspectives;
wherein, optionally, at least two illumination spots in the array differ from one another in one or more optical parameters.

20. A computer-readable non-transitory storage medium storing instructions that cause a sample analysis system, comprising an acousto-optic deflector (AOD), to:
obtain scan data, in a multiplicity of perspectives, of a slice of a sample by utilizing the AOD to generate a beam train, which is scanned along consecutive lines on the slice, in groups of n≥2 successively scanned lines, such that (i) along each line the beam train forms at least one illumination spot, respectively, and (ii) each line in each group of n≥2 lines is scanned in a respective perspective from the multiplicity of perspectives;
wherein consecutive lines are longitudinally displaced relative to one another, such as to overlap in, or substantially in, $100 \cdot (n-1)/n$ % of widths thereof, so that the slice is fully, or substantially fully, scanned in each of the perspectives; and
wherein, optionally, the instructions further cause the sample analysis system to analyze the obtained scan data by subjecting the scan data to an integrated analysis, which takes into account cross-perspective covariances between different perspectives from the multiplicity of perspectives.

* * * * *